United States Patent
Stone (10) Patent No.: US 10,834,901 B1
(45) Date of Patent: Nov. 17, 2020

(54) ANIMAL RESTRAINT SYSTEMS AND METHODS

(71) Applicant: Nicholas David Stone, Mill Creek, WA (US)

(72) Inventor: Nicholas David Stone, Mill Creek, WA (US)

( * ) Notice: Subject to any disclaimer, the term of this patent is extended or adjusted under 35 U.S.C. 154(b) by 218 days.

(21) Appl. No.: 16/019,364

(22) Filed: Jun. 26, 2018

Related U.S. Application Data (60) Provisional application No. 62/524,768, filed on Jun. 26, 2017.

(51) Int. Cl.
*A01K 27/00* (2006.01)
*A01K 1/04* (2006.01)

(52) U.S. Cl.
CPC .............. *A01K 27/003* (2013.01); *A01K 1/04* (2013.01)

(58) Field of Classification Search
CPC ..... A01K 27/00; A01K 27/003; A01K 27/004
USPC ....... 119/786, 788, 791, 792, 795, 797, 798, 119/863, 794, 856, 857
See application file for complete search history.

(56) References Cited

U.S. PATENT DOCUMENTS

| | | |
|---|---|---|
| 2,714,873 A | 8/1955 | Mosby |
| 3,100,476 A * | 8/1963 | Peak ........................ A01K 1/04 119/786 |
| 3,703,160 A | 11/1972 | Biddle |
| 4,738,222 A | 4/1988 | Terry et al. |
| 5,526,774 A | 6/1996 | Swindall, Jr. et al. |
| 5,666,909 A * | 9/1997 | Dupre .................. A01K 27/003 119/797 |
| 6,725,872 B2 * | 4/2004 | Kindell .................... A01K 1/04 119/786 |
| 6,810,630 B2 | 11/2004 | Chizmas |
| 7,484,477 B2 * | 2/2009 | Wojcik ..................... A01K 1/04 119/51.01 |
| 7,673,588 B2 * | 3/2010 | Head ........................ A01K 1/04 119/786 |
| 7,921,815 B2 | 4/2011 | Moran |
| 7,926,451 B2 * | 4/2011 | Foster .................. A01K 27/003 119/787 |

(Continued)

FOREIGN PATENT DOCUMENTS

| | | |
|---|---|---|
| CA | 2656852 | 6/2014 |
| DE | 102011006381 | 4/2014 |

(Continued)

*Primary Examiner* — Richard T Price, Jr.
(74) *Attorney, Agent, or Firm* — Michael R. Schacht; Schacht Law Office, Inc.

(57) ABSTRACT

A restraint system for an animal, comprising a stake member, a link member, and a restraint member. A first end of the restraint member is operatively connected to the link member. A second end of the restraint member is configured to be operatively connected to the animal. The stake member is arranged such that a neck portion is within the link passageway, a base portion is on a first side of the link member, and a grip portion is on a second side of the link member. The restraint system is used in a leash mode by gripping the grip portion of the stake member with the second end of the restraint member connected to the animal and in a tether mode with the base portion in secured relative to an object and the second end of the restraint member connected to the animal.

20 Claims, 5 Drawing Sheets

(56) References Cited

U.S. PATENT DOCUMENTS

| | | | |
|---|---|---|---|
| 8,683,959 B2 * | 4/2014 | Friedland | ................ A01K 1/04 |
| | | | 119/792 |
| 2006/0113117 A1 | 6/2006 | Tuller | |
| 2008/0072845 A1 | 3/2008 | Head | |
| 2016/0032551 A1 | 2/2016 | Yackley | |

FOREIGN PATENT DOCUMENTS

| | | | |
|---|---|---|---|
| WO | 2012042205 A9 | 6/2012 | |
| WO | 2012130982 A1 | 10/2012 | |

* cited by examiner

ANIMAL RESTRAINT SYSTEMS AND METHODS

RELATED APPLICATIONS

This application, U.S. patent application Ser. No. 16/019,364 filed Jun. 26, 2018 claims benefit of U.S. Provisional Application Ser. No. 62/524,768 filed Jun. 26, 2017, the contents of which are incorporated herein by reference.

TECHNICAL FIELD

The present invention relates to animal restraints and, in particular, to leashes or tethers for animals such as dogs.

BACKGROUND

A leash or tether is often used when a handler walks an animal such as a dog. The present invention is of particular significance when applied to dogs, and that application of the present invention will be described herein in detail. However, the present invention may be configured to accommodate animals other than dogs, such as cats or circus animals, and the scope of the present invention should be determined by the claims appended hereto and not the following detailed description of examples of the present invention.

A leash or tether typically comprises a proximal end and a distal end. The proximal end is held by the handler walking the animal, and the distal end is secured to a collar or other type of device worn by the animal being walked. The proximal end typically comprises a handle to facilitate gripping by the handler. The distal end typically comprises a clip to allow the leash or tether to be easily connected to and disconnected from the collar.

While walking an animal such as a dog on a leash or tether, the need sometimes arises for securing the animal at a desired location. Typically, the proximal end (e.g., handle) is secured to a stationary object (e.g., park bench, light pole, tree) while the distal end is secured to the collar worn by the animal. With the proximal end secured to the stationary object, the handler may be freed up to do other things such as supervising children or handling other animals.

The need exists for improved systems and methods for securing the proximal end of a leash or tether at a desired location to restrain movement of an animal secured to the proximal end of the leash or tether.

SUMMARY

Accordingly, disclosed herein is a restraint system that can be used to walk an animal but can also be anchored in a variety of situations. The restraint includes a leash to attach to the animal along with multiple anchoring mechanisms including a stake and a handle having a releasable clip to facilitate attachment of the handle to an object such as a post or bench. The device may serve multiple purposes including walking, restraining, holding, and tethering an animal, and in some embodiments may also include a pocket for holding items such as keys, a wallet, a cell phone, or animal waste bags.

An animal restraint system of the present invention may include a stake having a base portion connected to a grip portion by a neck portion; a leash having a first end and a second end, the first end of the leash being rotatably coupled to the neck portion of the stake by a connection device, the second end of the leash having a clip attached thereto for securing the leash to an animal; and a loop-shaped handle coupled to the connection device, the handle including a detachable connector such that the handle can be wrapped around and removably connected to an object.

The present invention may also be embodied as a restraint system for an animal comprising a stake member, a link member, and a restraint member. The stake member comprises a base portion, a neck portion, and a grip portion. The neck portion is arranged between the base portion and the grip portion. The link member defines a link passageway. The restraint member defines a first end and a second end. The first end of the restraint member is operatively connected to the link member. The second end of the restraint member is configured to be operatively connected to the animal. The stake member is arranged such that the neck portion is within the link passageway, the base portion is on a first side of the link member, and the grip portion is on a second side of the link member. The restraint system is used in a leash mode by gripping the grip portion of the stake member with the second end of the restraint member connected to the animal and in a tether mode with the base portion in secured relative to an object and the second end of the restraint member connected to the animal.

The present invention may also be embodied as a restraint system for allowing a handler to restrain an animal comprising a stake member, a link member, a restraint member, and a handle member. The stake member defines a stake axis and comprises a base portion, a neck portion, and a grip portion, where base portion, a neck portion, and a grip portion are integrally formed from a metal rod such that the neck portion is arranged between the base portion and the grip portion. The link member defines a link passageway. The restraint member defines a first end and a second end. The handle member defines a first handle loop and a second handle loop. The first end of the restraint member is operatively connected to the link member. The second end of the restraint member is configured to be operatively connected to the animal. The first handle loop is operatively connected to the link member. The second handle loop is configured to be gripped by the handler. The stake member is arranged such that the neck portion is within the link passageway, the base portion is on a first side of the link member, and the grip portion is on a second side of the link member such that the stake member is axially rotatable relative to the link member and linear movement of the stake member along the stake axis relative to the link member is inhibited. The restraint system is used in a leash mode by gripping the grip portion of the stake member with the second end of the restraint member connected to the animal and a tether mode with the base portion in secured relative to an object and the second end of the restraint member connected to the animal.

The present invention may also be embodied as a method of restraining an animal comprising the following steps. A stake member comprising a base portion, a neck portion, and a grip portion is provided. The neck portion is arranged between the base portion and the grip portion. A link member defining a link passageway is provided. A restraint member defining a first end and a second end is provided. The first end of the restraint member is operatively connected to the link member. The second end of the restraint member is configured to be operatively connected to the animal. The stake member is arranged such that the neck portion is within the link passageway, the base portion is on a first side of the link member, and the grip portion is on a second side of the link member. The restraint system is used in a leash mode by gripping the grip portion of the stake member with the second end of the restraint member connected to the animal and a tether mode with the base portion in secured relative to an object and the second end of the restraint member connected to the animal.

Other aspects of the invention will become apparent by consideration of the detailed description and accompanying drawings.

DETAILED DESCRIPTION

The animal restraint system of the present invention may be embodied in a number of different forms, and several example embodiments of the present invention will be described below.

I. First Example Animal Restraint System

Referring initially to FIGS. 1-5 of the drawing, depicted therein is a first example animal restraint system 20 constructed in accordance with, and embodying, the principles of the present invention.

The first example animal restraint system 20 comprises a restraint member 30, a link member 32, a stake member 34, and, optionally, a handle member 40 and a clip assembly 42. The example restraint member 30 is a length of flexible material 50 connected (e.g., by sewing and/or gluing) to itself at first (proximal) and second (distal) ends 50a and 50b to define first and second connecting member loops 52 and 54. A spacing portion 56 of the flexible material 50 extends between the first and second connecting member loops 52 and 54. The example link member 32 is a closed loop defining a link passageway 60. The example stake member 34 comprises a grip portion 70, a base portion 72, and a neck portion 74. The example handle member 40 is a length of flexible material 80 connected (e.g., by sewing and/or gluing) to itself at a first handle member location 80a to define first (proximal) and second (distal) handle member loops 82 and 84. In this discussion, the terms "proximal" and "distal" are used with reference to the link member 32 and the stake member 34.

Figures 1, 2, 3:
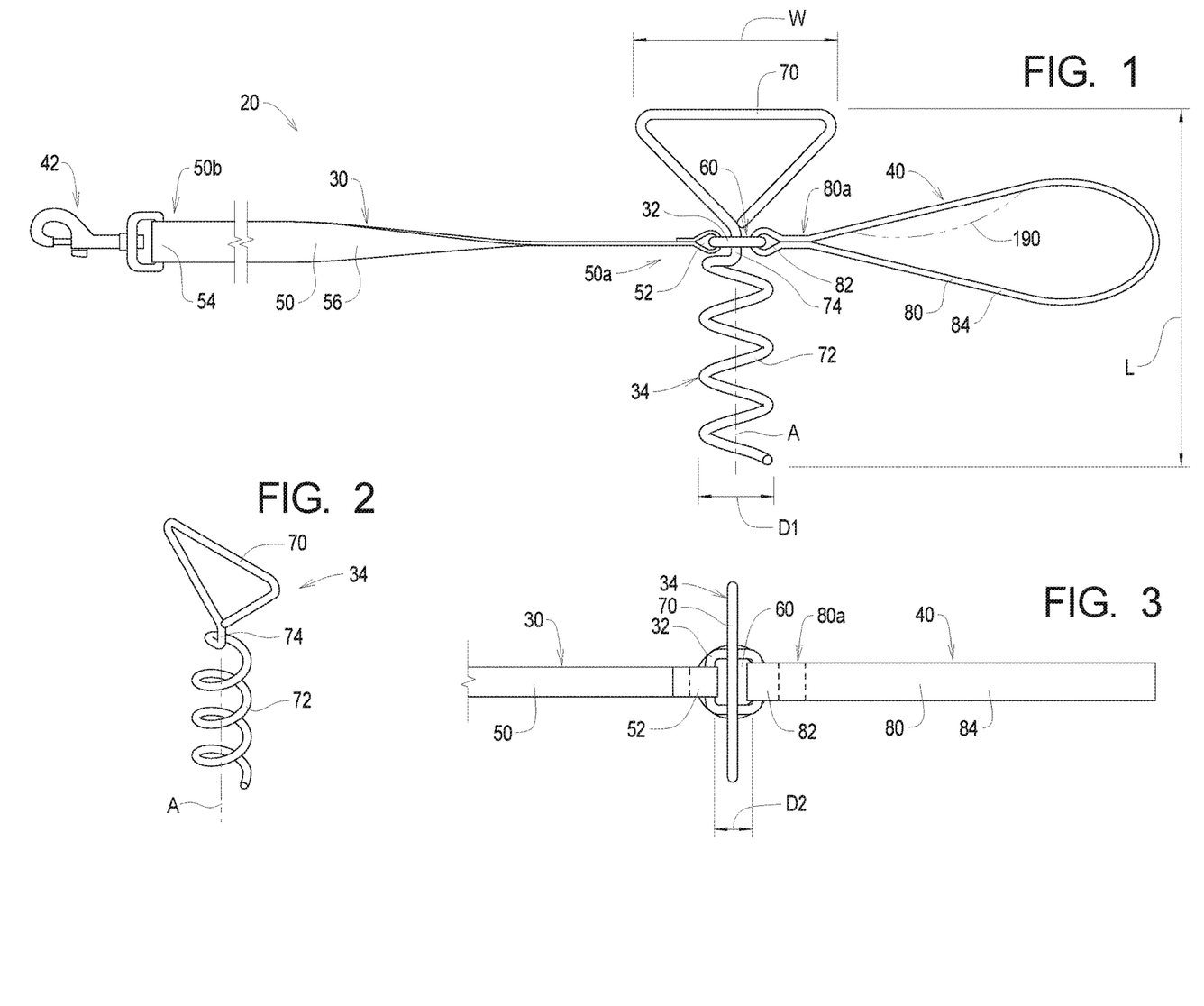
FIG. 1 is a side elevation view of a first example animal restraint system of the present invention.
FIG. 2 is a perspective view of a stake member forming a part of the first example animal restraint system.
FIG. 3 is a top plan view of a portion of the first example animal restraint system.

To assemble the first example animal restraint system 20, the first connecting member loop 52 is arranged to encircle a portion of the link member 32, and the second connecting member loop 54 is arranged to encircle a portion of the clip assembly 42. The first handle member loop 82 is arranged to encircle a portion of the link member 32. Alternatively, if the link member 32 is not used, the first handle member loop 82 may be arranged to encircle a portion (e.g., neck portion 74) of the stake member 34. The ground engage portion 72 of the stake member 34 is passed through the link passageway 60 of the link member 32 until the neck portion 74 of the stake resides in the link passageway 60 as shown in FIG. 1. At this point, the grip portion 70 is arranged on a first side (e.g., above) of the link member 32 and the base portion is arranged on a second side (e.g., below) the link member. The restraint member 30 and handle member 40 are secured to the link member 32 such that loads on the restraint member 30 are transferred to the handle member 40 through the link. Linear displacement of the stake member 34 along a stake axis A is limited, but the stake member 34 may be axially rotated relative to the link member 32 about the stake axis A.

Figure 4:
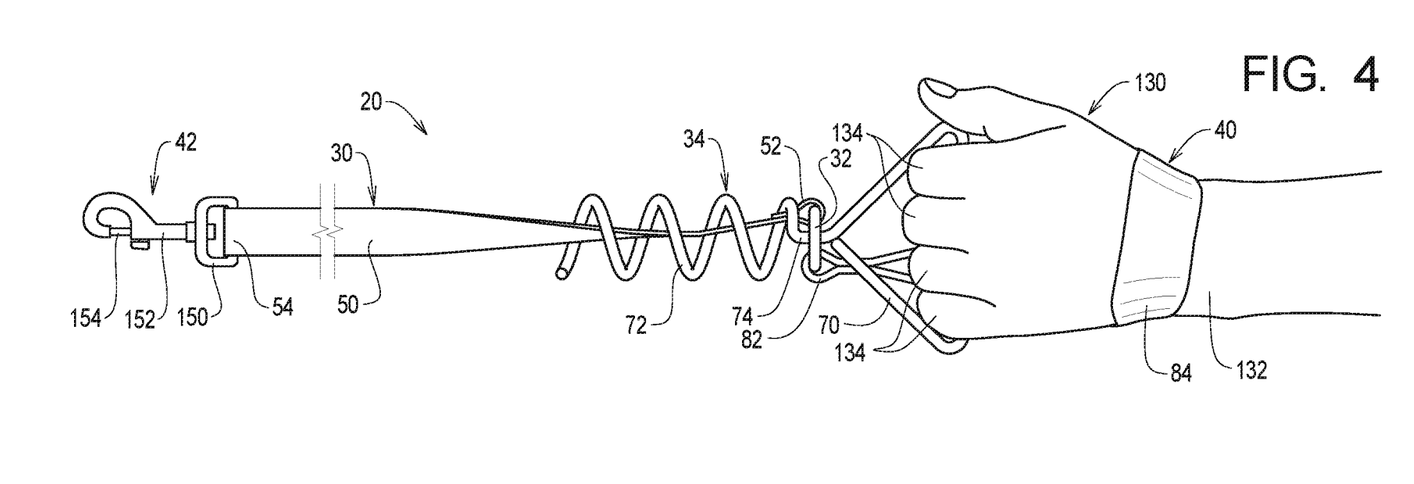
FIG. 4 is a side elevation view of the first example animal restraint when gripped by a handler.
Figure 5:
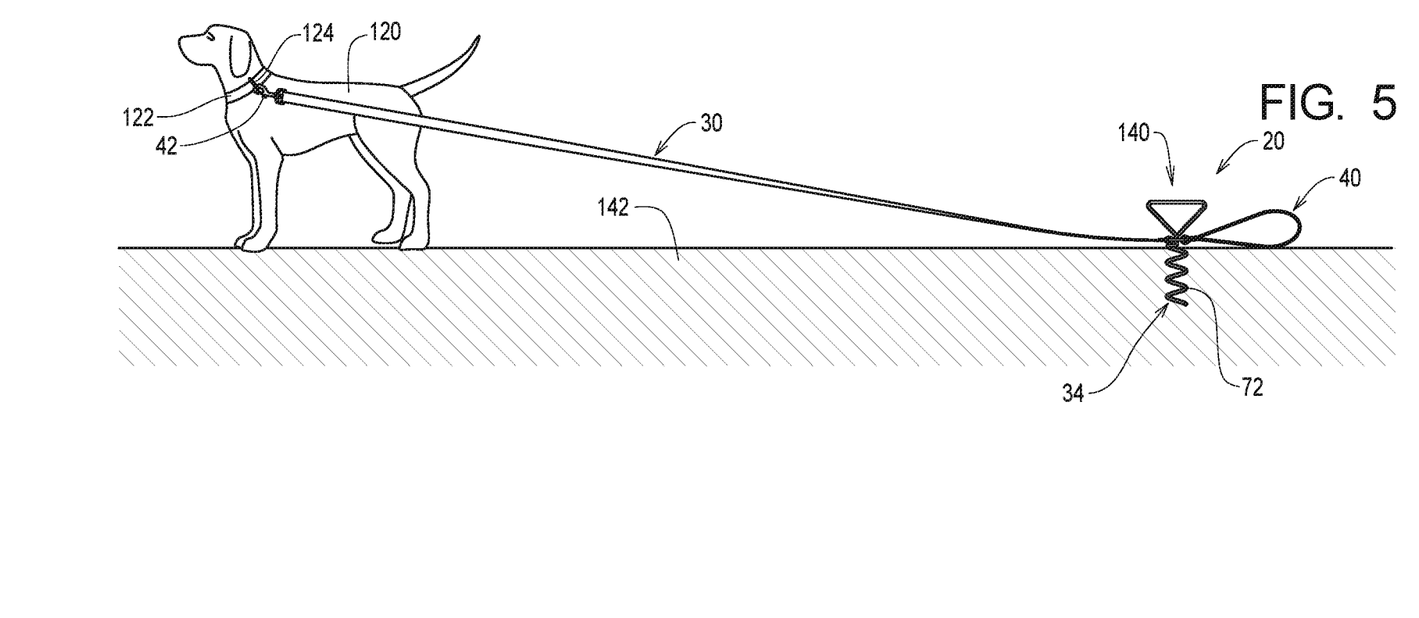
FIG. 5 is a side elevation view of the first example animal restraint being used to restrain movement of a dog about a desired location.

The first example animal restraint system 20 may be used in a leash mode (FIG. 4) and in a tether mode (FIG. 5). As shown in FIG. 5, the first example animal restraint system 20 may be used to handle a dog 120 having a collar 122 with a collar loop 124. In both modes, the clip assembly 42 is secured to the collar loop 124 on the collar 122 of the dog 120. A hand 130, wrist 132, and fingers 134 of a handler (not shown) are visible in FIG. 4. The dog 120, collar 122, and collar loop 124 are not shown in FIG. 4 for clarity and simplicity but would be connected to the first example restraint system 20 during normal use in both the leash mode and in the tether mode.

In the leash mode, the handler grips one or both of the grip portion 70 of the stake member 34 and the handle member 40. In particular, as depicted in FIG. 4, the second handle member loop 84 of the handle member 40 is arranged on the handler's wrist 132 above the handler's hand 130 while the handler's fingers 134 grip the grip portion 70 of the stake member 34. Loads on the connecting member 34 are thus transferred through the link member 32 to the user's hand 130 through one or both of the grip portion 70 and the handle member 40. Alternatively, the handler may grip only the grip portion 70 and not the handle member 40, may only arrange the handle member 40 around the wrist 132 and not grip any portion of the stake member 34, may grip the handle member 40 and the grip portion using the fingers 134, or may grip only the handle member 40 with the fingers 134.

In the tether mode, the handler arranges the stake member 34 at a desired location 140 in the ground 142 and drives the base portion 72 of the stake member 34 into the ground 142 at the desired location 140. Loads on the connecting member 34 are thus transferred through the link member 32 to the stake member 34 and, through the base portion 72, to the ground 142. the base portion 72 will resist movement of the stake member 34. Depending on the nature of the material defining the ground 142 at the desired location 140, the first example animal restraint system 20 will limit movement to a circular area centered about the desired location. The dimensions of the circular area will be determined by an effective length of the restraint member 30.

The example restraint member 30 is a length of conventional strapping material of the type commonly used as an animal leash. Alternative structures that may be used as the restraint member 30 include rope, wire, or other materials capable of effectively transferring loads from the clip assembly 42 to the stake member 34 and/or the handle member 40 through the link member 32. In general, the restraint member 30 is attached to the neck portion 74 of the stake member 34. In some embodiments the restraint member 30 is rotatably coupled to the neck portion 74 of the stake member 34 using the link member 32, as shown in FIGS. 1-4. The link member 32 may be a ring made of steel or other suitable material. An advantage of attaching the restraint member 30 to the neck portion 74 of the stake member 34 using the link member 32 is that the link member 32 facilitates the restraint member 30 pivoting around the neck portion 74 as well as attachment of the handle member 40. Allowing the restraint member 30 to pivot around the neck portion 74 of the stake member 34 is particularly useful when the stake member 34 is driven into the ground so that the tethered animal can move around the stake member 34 without entangling the leash.

The restraint member 30 is typically an animal tethering leash that is fixed to the neck portion 74 of the stake member 34 or the link member 32, for example by feeding an end of the restraint member 30 through the link member 32 (or around the neck portion 74) and joining (e.g. stitching or riveting) the end in a loop. The leash may be made out of nylon webbing but alternatively may be made of other materials such as cotton rope, chain, or leather, provided that the material is sufficiently strong and flexible. The leash may be various widths, for example up to 1" wide, and various lengths, for example between 1' and 10' long. In one particular embodiment, the restraint member 30 is 6' long and 0.5" wide.

The example link member 32 is rigid ring or washer made of metal. Alternative structures that may be used as the restraint member 30 include ropes, wires, fabrics, and other structures defining a closed loop that is capable of effectively transferring loads from the restraint member 30 to the stake member 34 and/or the handle member 40.

Referring now back to FIGS. 1 and 2 of the drawing, the example stake member 34 will now be described in further detail. In the example stake member 34, the base portion 72 defines curved shape such as a helical or spiral shape. The helical or spiral shape of the base portion 72 simplifies insertion of the base portion 72 into the ground 142 by reducing surface area of the base portion 72 at the point of entry into the ground 142 and allowing the user to rotate the stake member 34 in a first direction about the stake axis A to auger the base portion 72 into the ground. The helical or spiral shape of the base portion 72 provides increased surface area that inhibits pulling of the stake member 34 out of the ground along the stake axis A. However, the base portion 72 may be removed by rotating the stake member 34 in a second direction about the stake axis A.

The example grip portion 70 is generally triangular in shape to facilitate both gripping in the leash mode and rotation of the example stake member 34 to auger the stake member 34 into the ground. The grip portion 70 may take other shapes, such as T-shaped, rectangular, and round, that facilitate use of the stake member 34 in the leash mode and in the tether mode as described herein.

As shown in FIG. 1, the base portion 72 defines a lateral stake dimension D1 that is larger than a lateral passageway dimension D2 defined by the link passageway 60. To insert the base portion 72 through the link passageway 60, the stake member 34 is rotated or displaced about the stake axis A while simultaneously displacing the helical or spiral base portion 72 through the link passageway 60. The larger stake lateral dimension D1 prevents removal of the base portion 72 from the link passageway 60 by simply displacing the stake member 34 along the stake axis A. Instead, to remove the base portion 72 from the link passageway, the stake member 34 must be rotated or displaced about the stake axis A while simultaneously displacing the helical or spiral base portion 72 back through the link passageway 60.

The example neck portion 74 defines a L-shape that connects the grip portion 70 to the base portion 72. The example neck portion 74 transfers loads from the grip portion 70 to the base portion 72 in the tether mode and from the grip portion 70 to the link member 32 when in the leash mode.

The example stake member 34 is made of a single piece of rigid rod bent to define the grip portion 70 and the base portion 72. As an example, lateral stake dimension D1 defined by the helical or corkscrew base portion 72 of the stake member 34 may have a width ranging from 0.5" to 1.5", and may for example be sized to provide an opening or pitch that allows the base portion 72 to be inserted through the link member 32. The weight of the stake member 34 may range from 0.5 oz. to 10 oz., although other widths and weights are also possible. The stake member 34 may be made of any sufficiently strong and lightweight material such as aluminum, iron, or steel. In one particular embodiment, the stake member 34 is made from steel that is hardened after it is formed so that a relatively thin gauge of steel can be used for a given animal weight to provide a stake member 34 that is strong yet lightweight. In one embodiment, the stake member 34 may be made from cold rolled hardened steel having 0.2" diameter. In other embodiments, the thickness of the stake member 34 may range from 0.1"-0.3" depending on the type of material chose and the strength of the selected material. In one embodiment, the stake member 34 includes a base portion 72 connected to a grip portion 70 by the neck portion 74. As generally discussed above, the grip portion 70 has a shape (e.g. triangular, as shown, or other shape such as square or circular) designed to be gripped to facilitate twisting of the base portion 72 into the ground.

An overall length L of the stake member 34, including the base portion 72, the neck portion 74, and the grip portion 70, may be from 7" to 12", while a lateral dimension W of the grip portion 70 may be from 3" to 6" wide. The grip portion 70 should be sufficiently wide to be gripped comfortably by the user's hand 130 or portion of the hand (e.g. large enough to insert one or more of the fingers 134 through the grip portion 70). In some embodiments, the grip portion 70 may be made sufficiently wide to accommodate an average user's entire hand so as to permit the user to apply more force to drive the base portion 72 into the ground (for example, when the base portion 72 of the stake member 34 is large).

And as perhaps best shown in FIG. 4, the link member 32 will typically not be entirely aligned with the stake axis A when the first example animal restraint system 20 is under tension. The misalignment of the link member 32 with the stake axis A will inhibit passage of the base portion 72 through the link passageway 60 during use of the first example animal restraint system 20 in the leash mode. The restraint member 30 will further inhibit passage of the ground engaging portion through the link passageway 60 during use of the first example animal restraint system 20 in the leash mode.

The example handle member 40 is a length of conventional strapping material of the type commonly used as an animal leash. Alternative structures that may be used as the restraint member 30 include rope, wire, or other materials capable of effectively transferring loads from the link member 32 to the user's hand 130, wrist 132, and/or fingers 134 without harming the user. And as suggested above, the handle member 40 may be omitted, in which case, in the leash mode, the user grips one or both of the restraint member 30 and the grip portion 70 of the stake member 34.

In certain embodiments, the first example restraint system 20 may include a loop-shaped handle member 40 coupled to the stake member 34, for example via the link member 32 or directly coupled to the neck portion 74 of the stake member 34. The handle member 40 may provide a comfortable grip for a user when walking an animal attached to the restraint member 30 and may include an optional storage pocket 190 and an optional clip assembly 42. The handle member 40 may be made out of nylon webbing but alternatively may be made of other materials such as cotton rope, chain, or leather, provided that the material is sufficiently strong and flexible. In general, the handle member 40 is a loop of material that is large enough for a user to slip their hand through so that the handle member 40 can rest around the user's wrist instead of, or in addition to, being held in the user's hand.

The example clip assembly 42 is conventional and comprises a clip loop 150, a clip body 152 pivotably attached to the clip loop 150, and a clip latch member 154 supported for linear movement by the clip body 152. And as suggested above, the clip assembly 42 may be omitted, in which case the restraint member 30 will be tied or otherwise directly connected to the collar 122 in both the leash mode and the tether mode. In any event, the clip assembly 42 is provided to attach the leash to the animal, e.g. to the collar 122 or harness worn by the animal (e.g. dog, cat, or other animal). If used, the clip assembly 42 may be any type of openable connector such as a clip, hook, or clamping device.

The first example restraint system 20 may be made in different sizes (e.g. small, medium, large) to accommodate animals having different sizes and weights (e.g. animals weighing up to 150 pounds). Components may have various colors and be made from a variety of materials as determined based on market demand.

II. Second Example Animal Restraint System

Referring now to FIGS. 6-9 of the drawing, depicted therein is a second example animal restraint system 220 constructed in accordance with, and embodying, the principles of the present invention.

The second example animal restraint system 220 comprises a restraint member 230, a link member 232, a stake member 234, and, optionally, a handle member 240, a clip assembly 242, and a stop member 244. The example restraint member 230 is a length of flexible material 250 terminated at first and second ends 250a and 250b to define first and second connecting member loops 252 and 254. A spacing portion 258 of the flexible material 250 extends between the first and second connecting member loops 252 and 254. The example link member 232 is a closed loop defining a link passageway 260. The example stake member 234 comprises a grip portion 270, a base portion 272, and a neck portion 274. The example handle member 240 is a length of flexible material 280 secured at a first handle member location 280a to define first and second handle member loops 282 and 284. The example handle member 240 further comprises a storage pocket 290 and a buckle 292.

To assemble the second example animal restraint system 220, the first connecting member loop 252 is arranged to encircle a portion of the link member 232, and the second connecting member loop 254 is arranged to encircle a portion of the clip loop 242. The first handle member loop 282 is arranged to encircle a portion of the link member 232.

Figure 6:
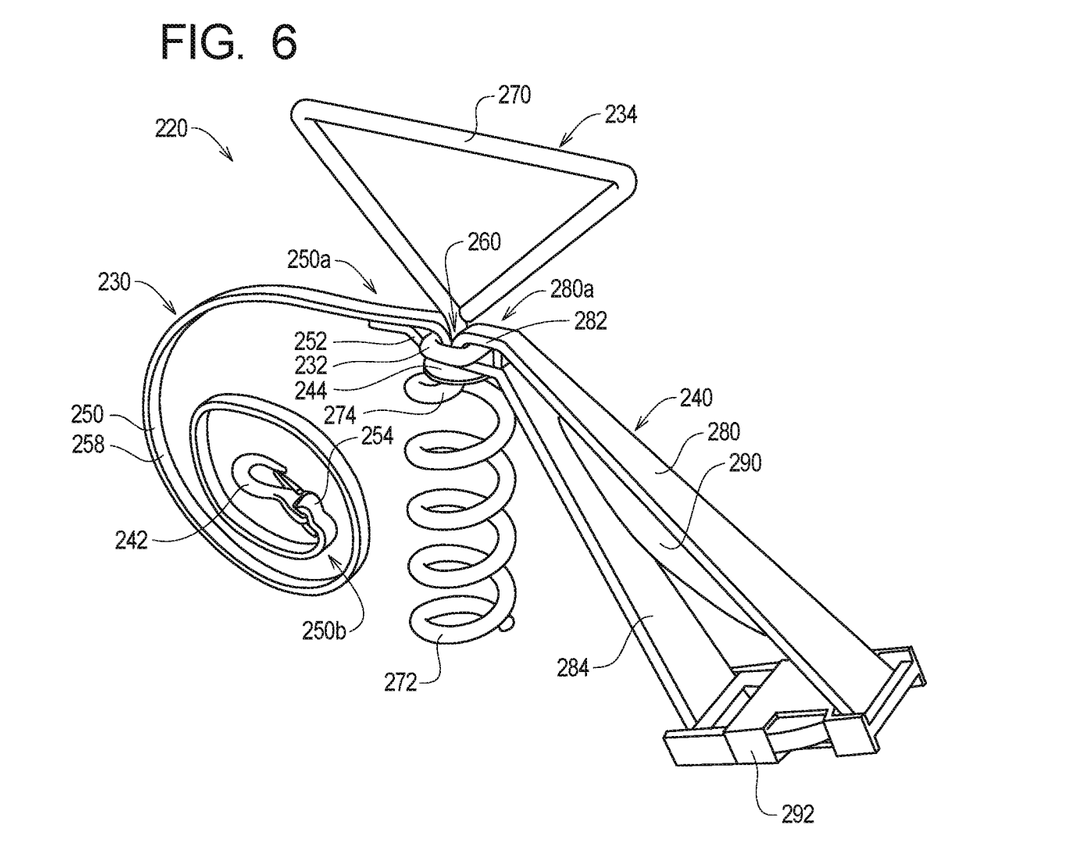
FIG. 6 is a perspective view of a second example restraint system of the present invention.
Figure 7:
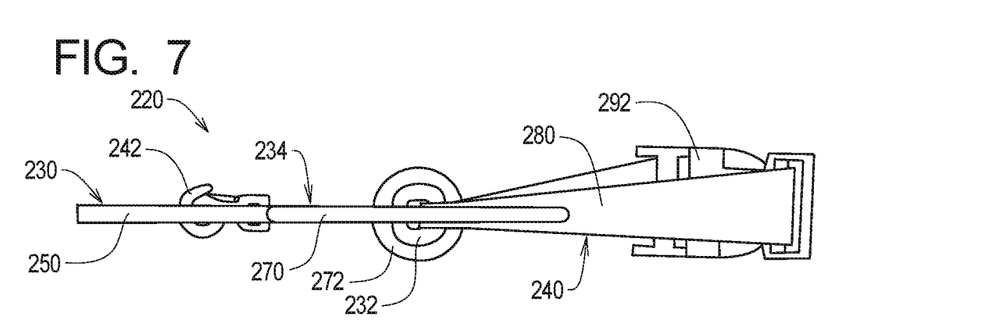
FIG. 7 is a top plan view of the second example restraint system.
Figure 8:
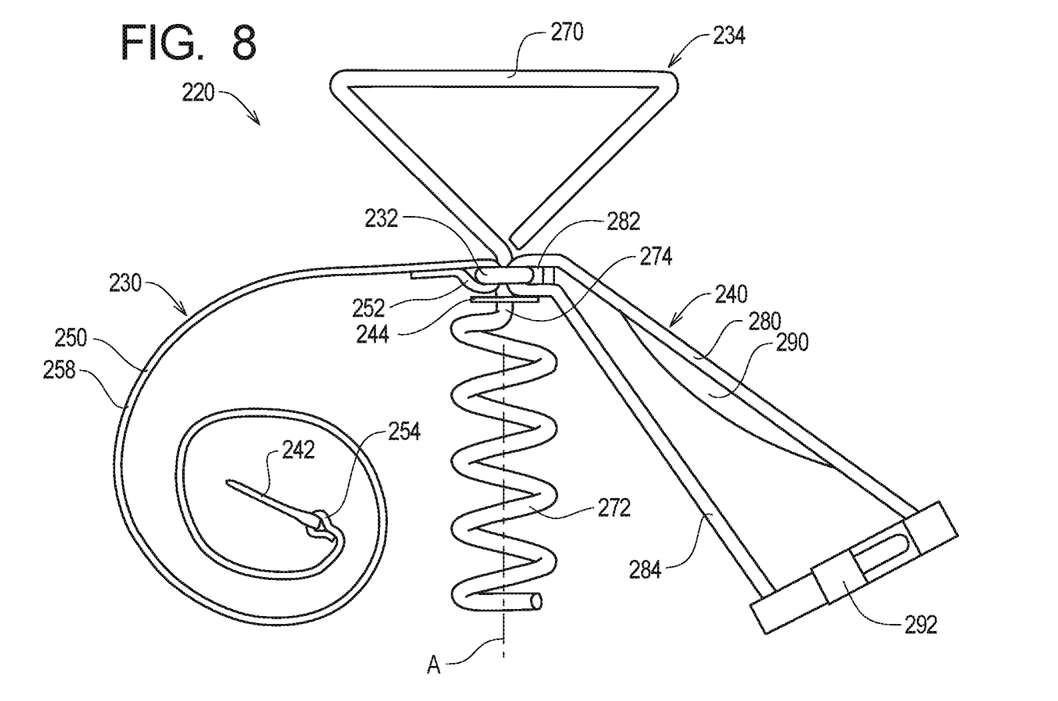
FIG. 8 is a side elevation view of the second example restraint system.
Figure 9:
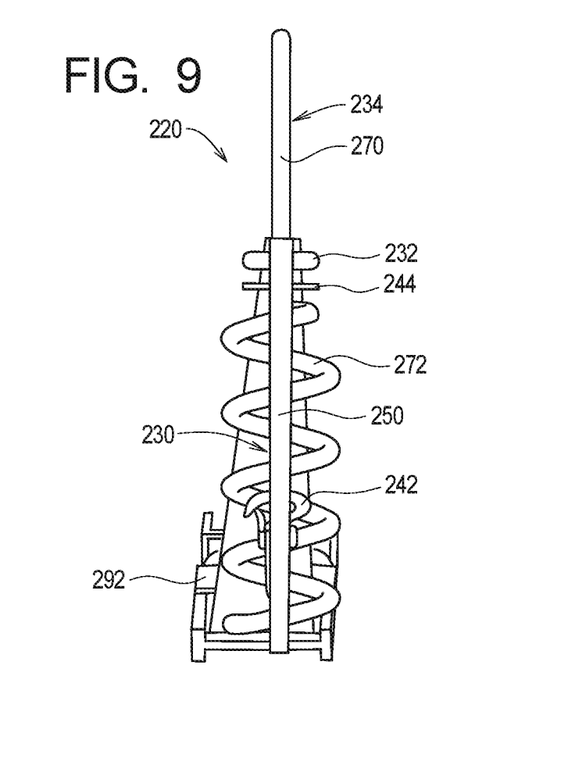
FIG. 9 is a second end view of the second example restraint system.

Alternatively, if the link member 232 is not used, the first handle member loop 282 may be arranged to encircle a portion (e.g., neck portion 274) of the stake member 234. The ground engage portion 272 of the stake member 234 is passed through the link passageway 260 of the link member 232 until the neck portion 274 of the stake resides in the link passageway 260 as best shown in FIGS. 6 and 8. At this point, the restraint member 230 and handle member 240 are secured to the link member 232 such that loads on the restraint member 230 are transferred to the handle member 240 through the link. Further, the stake member 234 may be rotated relative to the link member 232 about a stake axis A.

The example stop member 244 may be a flat washer or ring made of steel or other suitable materials that are sufficiently rigid to maintain a flat shape. The example stop member 244 forms a support or stop that engages a lower part of the neck portion 274 of the stake member 234 to keep the link member 232 from sliding down the base portion 272. The example stop member may be welded onto the neck portion 274 or may be held in place by or omitted in favor of other means such as by crimping the neck portion 274 above and/or below the link member 232 to keep it from moving up or down the neck portion 274.

The storage pocket 290 is optional and may be made of fabric or other suitable material and may be provided in a size to accommodate objects such as the user's keys, cell phone, wallet, and/or waste disposal bags. The storage pocket 290 may include a closure mechanism such as a zipper, Velcro, snaps, elastic, or a drawstring. The optional buckle assembly 292 permits the handle member 240 to be attached to an elongate object (e.g. a pole, a handle, a chair, a table, a tree, a bench, etc.) to restrain an animal and is particularly useful when there is no suitable ground into which the base portion 272 of the stake member 234 may be driven. The optional buckle assembly 292 is fixed to the material of the handle member 240 and is any suitable connector (e.g. with releasable squeeze tabs) that can be repeatedly opened and closed and provides sufficient holding power when in the closed configuration.

In operation, a user attaches the clip assembly 242 of the second example restraint system 220 to an animal's collar or harness and holds the handle member 240 to walk the animal. The restraint member 230 may optionally be fed through the center of the base portion 272 of the stake member 234 so that the second example restraint system 220 is more compact and so that the stake member 234 is inhibited from moving around while walking (e.g., FIG. 4). However, the handler or user can restrain the animal by driving the stake member 234 into the ground or other surface (by rotating the grip portion 270), or by attaching the handle member 240 to an object. If used, the buckle assembly 292 may be unclipped so that the handle member 240 may be wrapped around an object (e.g. post, bench, or other suitable object) and the clip assembly 242 reclipped to ensure that the second example restraint system 220 remains coupled to the object.

Like the first example restraint system 20, the second example restraint system 220 may be used in a leash mode and in a tether mode as described above with reference to FIGS. 4 and 5.

III. Third Example Animal Restraint System

Figure 10:
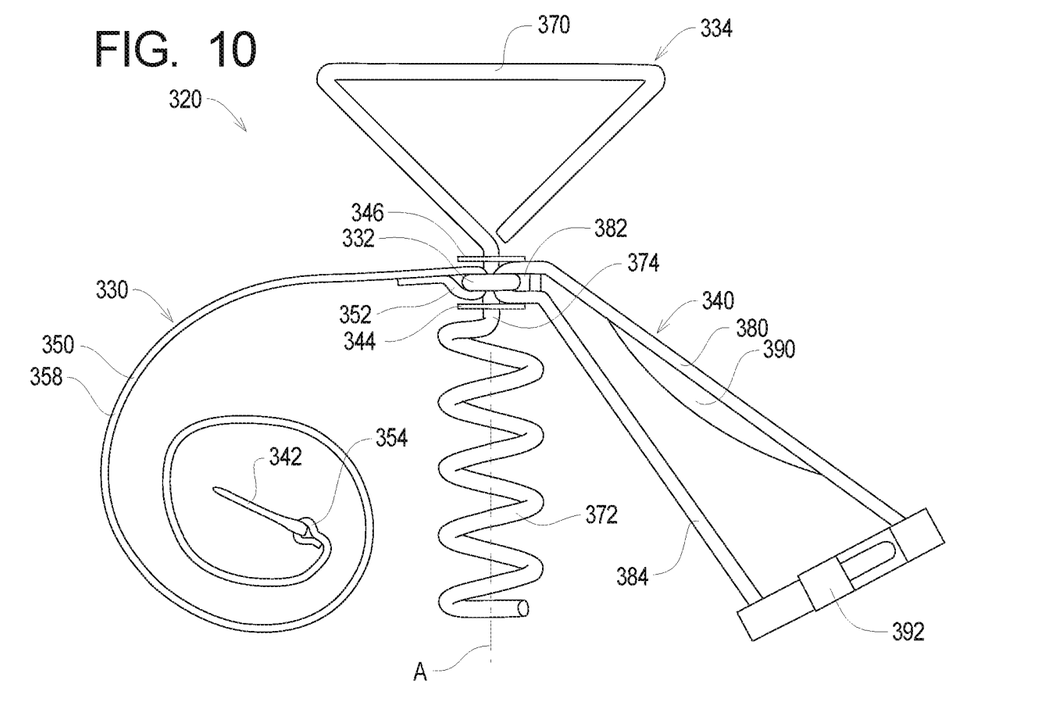
FIG. 10 is a side elevation view of a third example restraint system of the present invention.
Figure 11:
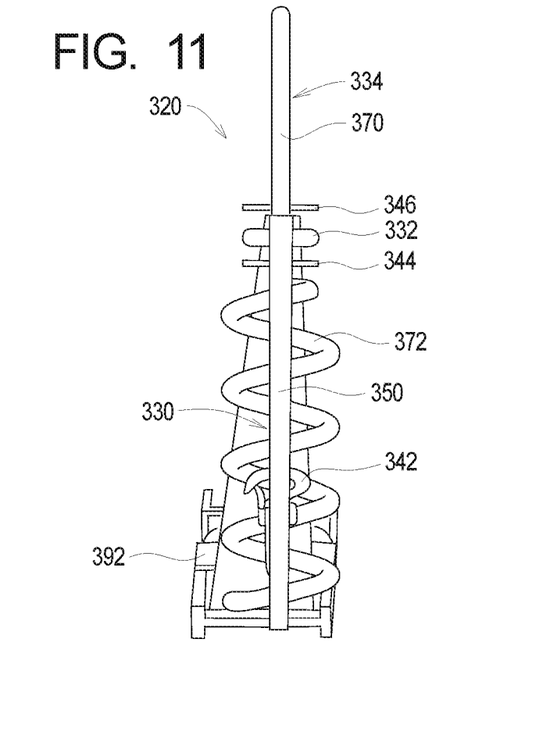
FIG. 11 is an end view of the third example restraint system.

Referring now to FIGS. 10 and 11 of the drawing, depicted therein is a third example animal restraint system 320 constructed in accordance with, and embodying, the principles of the present invention.

The third example animal restraint system 320 comprises a restraint member 330, a link member 332, a stake member 334, and, optionally, a handle member 340, a clip assembly 342, and first and second stop members 344 and 346. The example restraint member 330 is a length of flexible material 350 connected to itself at first and second ends 350a and 350b to define first and second connecting member loops 352 and 354. A spacing portion 358 of the flexible material 350 extends between the first and second connecting member loops 352 and 354. The example link member 332 is a closed loop defining a link passageway 360. The example stake member 334 comprises a grip portion 370, a base portion 372, and a neck portion 374. The example handle member 340 is a length of flexible material 380 secured at a first handle member location 380a to define first and second handle member loops 382 and 384. The example handle member 340 further comprises a storage pocket 390 and a buckle 392.

To assemble the third example animal restraint system 320, the first connecting member loop 352 is arranged to encircle a portion of the link member 332, and the second connecting member loop 354 is arranged to encircle a portion of the clip loop 342. The first handle member loop 382 is arranged to encircle a portion of the link member 332. Alternatively, if the link member 332 is not used, the first handle member loop 382 may be arranged to encircle a portion (e.g., neck portion 374) of the stake member 334. The ground engage portion 372 of the stake member 334 is passed through the link passageway 360 of the link member 332 until the neck portion 374 of the stake resides in the link passageway 360 as shown in FIG. 10. At this point, the restraint member 330 and handle member 340 are secured to the link member 332 such that loads on the restraint member 330 are transferred to the handle member 340 through the link. Further, the stake member 334 may be rotated relative to the link member 332 about a stake axis A.

The example stop members 344 and 346 may be flat washers or rings made of steel or other suitable materials that are sufficiently rigid to maintain a flat shape. The example first stop member 344 forms a support or stop that engages a lower part of the neck portion 374 of the stake member 334 to keep the link member 332 from sliding down the base portion 372. The example second stop member 346 forms a support or stop that engages an upper part of the neck portion 374 of the stake member 334 to keep the link member 332 from sliding up towards the grip portion 370. The example stop members 344 and 346 may be welded onto the neck portion 374 or may be held in place by or omitted in favor of other means such as by crimping the neck portion 374 above and/or below the link member 332 to keep it from moving up or down the neck portion 374. In other embodiments, the grip portion 370 (which may be a circle or a polygon shape such as a triangle) may be formed as a closed shape (e.g. by gluing or welding the end of the stake member 334 near the neck portion 374) to form a closed figure to prevent the link member 332 from sliding upwards.

The storage pocket 390 is optional and may be made of fabric or other suitable material and may be provided in a size to accommodate objects such as the user's keys, cell phone, wallet, and/or waste disposal bags. The storage pocket 390 may include a closure mechanism such as a zipper, Velcro, snaps, elastic, or a drawstring. The optional buckle assembly 392 permits the handle member 340 to be attached to an object (e.g. poles, handles, chairs, tables, trees, benches, etc.) to restrain an animal and is particularly useful when there is no suitable ground into which the base portion 372 of the stake member 334 may be driven. The optional buckle assembly 392 is fixed to the material of the handle member 340 and is any suitable connector (e.g. with releasable squeeze tabs) that can be repeatedly opened and closed and provides sufficient holding power when in the closed configuration.

In operation, a user attaches the clip assembly 342 of the third example restraint system 320 to an animal's collar or harness and holds the handle member 340 to walk the animal. The restraint member 330 may optionally be fed through the center of the base portion 372 of the stake member 334 so that the third example restraint system 320 is more compact and so that the stake member 334 is inhibited from moving around while walking (e.g., FIG. 4). However, the handler or user can restrain the animal by driving the stake member 334 into the ground or other surface (by rotating the grip portion 370), or by attaching the handle member 340 to an object. If used, the buckle assembly 392 may be unclipped so that the handle member 340 may be wrapped around an object (e.g. post, bench, or other suitable object) and the clip assembly 342 reclipped to ensure that the third example restraint system 320 remains coupled to the object.

Like the first and second example restraint systems 20 and 220, the third example restraint system 320 may be used in a leash mode and in a tether mode as described above with reference to FIGS. 4 and 5.

What is claimed is:

1. A restraint system for an animal, comprising:
    a stake member comprising a base portion, a neck portion, and a grip portion, where the neck portion is arranged between the base portion and the grip portion;
    a link member defining a link passageway; and
    a restraint member defining a first end and a second end;
    the first end of the restraint member is operatively connected to the link member;
    the second end of the restraint member is configured to be operatively connected to the animal;
    the stake member is arranged such that the neck portion is within the link passageway, the base portion is on a first side of the link member, and the grip portion is on a second side of the link member;
    the restraint system is used in
        a leash mode by gripping the grip portion of the stake member with the second end of the restraint member connected to the animal, and
        a tether mode with the base portion in secured relative to an object and the second end of the restraint member connected to the animal.

2. A restraint system as recited in claim 1, in which the object is the ground.

3. A restraint system as recited in claim 2, in which the stake member is rotatable relative to the link member to facilitate driving of the base portion of the stake member into the ground.

4. A restraint system as recited in claim 1, in which the object is at least one of a tree and a pole.

5. A restraint system as recited in claim 1, further comprising a handle member operatively connected to the link member.

6. A restraint system as recited in claim 5, in which the handle member further comprises a storage pocket.

7. A restraint system as recited in claim 5, in which the handle member further comprises a storage pocket.

8. A restraint system as recited in claim 1, in which the base portion of the stake member defines a curved shape.

9. A restraint system as recited in claim 8, in which the curved shape is one of a helical shape, a spiral shape, and a corkscrew shape.

10. A restraint system as recited in claim 8, in which the stake member is rotatable relative to the link member to facilitate augering of the base portion of the stake member into the ground.

11. A restraint system as recited in claim 8, in which the stake member is rotatable relative to the link member to facilitate augering of the base portion of the stake member into the ground.

12. A restraint system as recited in claim 1, in which the base portion, the neck portion, and the base portion of the stake member are integrally formed from a rod of metal.

13. A restraint system as recited in claim 1, further comprising a first stop member arranged to limit linear displacement of the stake member relative to the link member while allowing axial rotation of the stake member relative to the link member.

14. A restraint system as recited in claim 13, further comprising a second stop member arranged to limit linear displacement of the stake member relative to the link member while allowing axial rotation of the stake member relative to the link member.

15. A restraint system as recited in claim 13, further comprising a second stop member arranged to limit linear displacement of the stake member relative to the link member while allowing axial rotation of the stake member relative to the link member.

16. A restraint system as recited in claim 1, further comprising a first stop member arranged to limit linear displacement of the stake member relative to the link member while allowing axial rotation of the stake member relative to the link member.

17. A restraint system for allowing a handler to restrain an animal, comprising:
   a stake member defining a stake axis and comprising a base portion, a neck portion, and a grip portion, where base portion, a neck portion, and a grip portion are integrally formed from a metal rod such that the neck portion is arranged between the base portion and the grip portion;
   a link member defining a link passageway;
   a restraint member defining a first end and a second end; and
   a handle member defining a first handle loop and a second handle loop;
   the first end of the restraint member is operatively connected to the link member;
   the second end of the restraint member is configured to be operatively connected to the animal;
   the first handle loop is operatively connected to the link member;
   the second handle loop is configured to be gripped by the handler;
   the stake member is arranged such that the neck portion is within the link passageway, the base portion is on a first side of the link member, and the grip portion is on a second side of the link member such that
      the stake member is axially rotatable relative to the link member, and
      linear movement of the stake member along the stake axis relative to the link member is inhibited;
   the restraint system is used in
      a leash mode by gripping the grip portion of the stake member with the second end of the restraint member connected to the animal, and
      a tether mode with the base portion in secured relative to an object and the second end of the restraint member connected to the animal.

18. A restraint system as recited in claim 17, in which the object is the ground.

19. A restraint system as recited in claim 18, in which the base portion of the stake member defines one of a helical shape, a spiral shape, and a corkscrew shape.

20. A method of restraining an animal comprising the steps of:
   providing a stake member comprising a base portion, a neck portion, and a grip portion, where the neck portion is arranged between the base portion and the grip portion;
   providing a link member defining a link passageway;
   providing a restraint member defining a first end and a second end;
   operatively connecting the first end of the restraint member to the link member;
   configuring the second end of the restraint member to be operatively connected to the animal;
   arranging the stake member such that the neck portion is within the link passageway, the base portion is on a first side of the link member, and the grip portion is on a second side of the link member;
   using the restraint system in
      a leash mode by gripping the grip portion of the stake member with the second end of the restraint member connected to the animal, and
      a tether mode with the base portion in secured relative to an object and the second end of the restraint member connected to the animal.

* * * * *